United States Patent [19]
Oglevee

[11] Patent Number: 6,138,410
[45] Date of Patent: Oct. 31, 2000

[54] AUTOMATION OF GRADING AND STICKING VEGETATIVE CUTTINGS AND ACCUMULATION THEREFOR

[75] Inventor: J. Robert Oglevee, deceased, late of Connellsville, Pa., by Jane Oglevee, legal representative

[73] Assignee: Oglevee, Ltd., Connellsville, Pa.

[21] Appl. No.: 09/337,841

[22] Filed: Jun. 22, 1999

Related U.S. Application Data

[60] Provisional application No. 60/090,388, Jun. 23, 1998.
[51] Int. Cl.[7] .......................... A01G 31/00; A01G 23/02; A01G 9/02
[52] U.S. Cl. ........................... 47/62; 47/73; 47/85; 47/87
[58] Field of Search .................................. 47/17, 62, 69, 47/73, 85, 87

[56] References Cited

U.S. PATENT DOCUMENTS

| | | | |
|---|---|---|---|
| 2,957,274 | 10/1960 | Colvin | 47/17 |
| 3,524,279 | 8/1970 | Adams | 47/87 |
| 4,224,765 | 9/1980 | Song | 47/85 |
| 4,586,288 | 5/1986 | Walton | 47/73 |
| 4,999,946 | 3/1991 | DeGiglio et al. | 47/73 |
| 5,010,686 | 4/1991 | Rivest | 47/62 |

*Primary Examiner*—Peter M. Poon
*Assistant Examiner*—Francis T. Palo
*Attorney, Agent, or Firm*—Webb Ziesenheim Logsdon Orkin & Hanson, P.C.

[57] ABSTRACT

A live plant container comprises an elongated trough, a hydratable propagating medium positioned in and substantially filling the trough, and a cover closing off the trough to form an oasis for the plants with the cover including a plurality of longitudinally spaced openings configured and dimensioned to form cells to retain live plants in an upright position when inserted through the opening into the propagating medium.

15 Claims, 1 Drawing Sheet

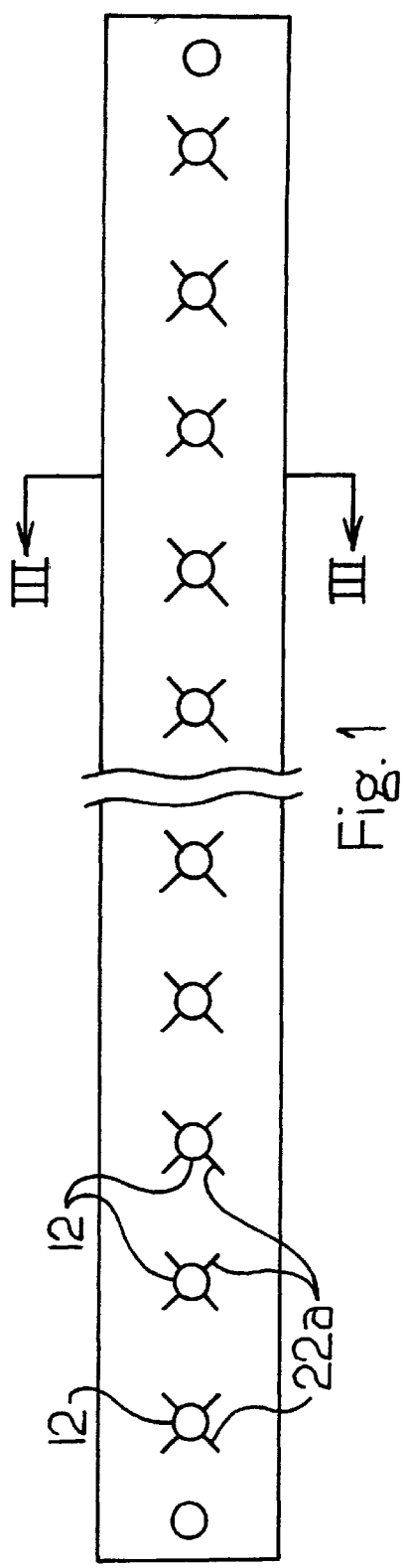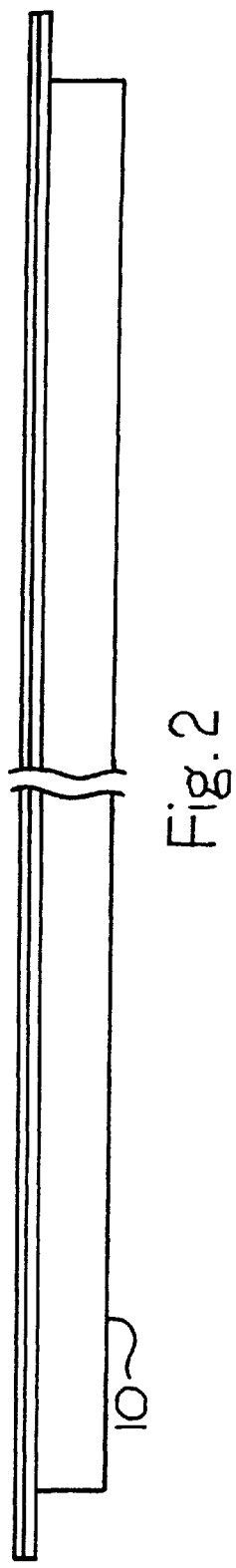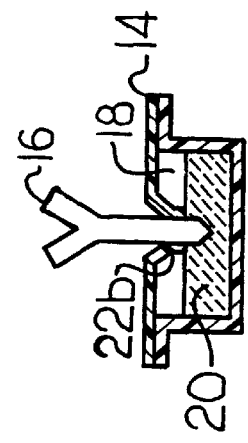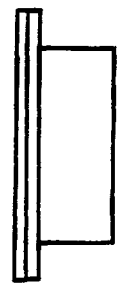

AUTOMATION OF GRADING AND STICKING VEGETATIVE CUTTINGS AND ACCUMULATION THEREFOR

CROSS REFERENCE TO RELATED APPLICATION

This application claims the benefit of U.S. Provisional Application Ser. No. 60/090,388, filed Jun. 23, 1998.

BACKGROUND OF THE INVENTION

1. Field of the Invention

This invention relates to the automation of grading and sticking vegetative cuttings and, more particularly, to a container for supporting unrooted cuttings immediately after harvest, through cold storage and which allows for automatic loading by a grading/sticking machine.

2. Description of the Prior Art

Vegetative propagation of floricultural products is currently a labor-intensive process. Labor costs are especially high in the procedures that harvest cuttings from mother plants, grade them to meet market standards, insert (stick) them in a suitable rooting media and, several weeks later, pack the finished product. Grading and sticking, in particular, are tedious and repetitive tasks, yet they require manual dexterity and rapid, precise visual distinction. All of this is currently handled manually.

Manual vegetative propagation involves several steps. The vegetative cuttings are harvested weekly from greenhouse-nurtured mother plants. They are cut to length and cleaned as they are harvested, then cooled and hydrated and shipped if necessary to the site where they will be rooted. Next, they are carried to a staging area where they are hand-classified into grades, typically three (3) based on several criteria that tend to predict characteristics of the mature cutting. The cuttings are then stuck in trays containing a rooting medium and grown in a greenhouse for several weeks. Finally, the rooted cuttings are packaged and shipped to the customer.

Certain floricultural products present particular problems during shipping. For example, most hydration of geraniums is critical to quality shipping, however, water on the leaves of geraniums is detrimental because of the discoloration (blackening) of the leaves which results from the confinement of the plants in the shipping containers.

It is an object of my invention to develop a production quality computer based vision system that would grade vegetative geranium cuttings in accordance with established standards. The criterion for success is performance that equals or exceeds the speed and accuracy of a human operator.

It is further an object to design an automated work cell to perform all functions in the grading and sticking of cuttings and develop machinery to automate the sticking process.

It is further an object of my invention to provide an accumulator which provides for the singulation of plant cuttings making automated material handling possible.

It is also an object of my invention to provide basal and vascular system hydration to improve shipping and overall increased performance.

SUMMARY OF THE INVENTION

The accumulator is a package or a container which provides a plurality of spaced openings so each plant cutting can be isolated. This isolation or singulation as it is called makes automated material handling possible. In turn, this provides for easy bar-coding and labeling for inventory control, simplifies access for automated insertion of cuttings into a growing medium, and the handling of multiple units and packaging for shipping.

The accumulator provides for a basal and vascular hydration system so that the cuttings may respond to their fullest potential. The accumulator provides for the continual hydration of cuttings through a water holding medium, which it contains. The water holding container of rooting medium serves as a callous shipping container for cuttings to customers who require calloused cuttings. Growth regulators can be added to the water to prepare the plant for shipping and growing. Postharvest conditioning chemicals can be added to provide for quality product upon delivery.

Containers support the cuttings upright in handling and transit allowing for the gravitational accumulation of natural auxin for root promotion.

BRIEF DESCRIPTION OF THE DRAWINGS

FIG. 1 is a top view of the preferred embodiment of the accumulator;

FIG. 2 is a side view thereof;

FIG. 3 is a sectional view taken along the line 3—3 of FIG. 1; and

FIG. 4 is an end view thereof.

DESCRIPTION OF THE PREFERRED EMBODIMENTS

The accumulator 10 is a narrow, elongated container with a plurality of openings 12 spaced equal distance along its axial extent. The container is made of a thin plastic, the top surface 14 of which crushes easily to accept plants (or cuttings) 16, but has the rigidity to hold the plant 16 upright during processing, storage and shipping. The container provides an oasis 18 in which the individual plants are initially placed and grown. The oasis 18 contains a propagating medium 20, such as an ureaformaldehyde foam. The oasis 18 can be supplemented to include water, nutrients, i.e., sugars and chemicals for storage and shipping, such as cytokinins and auxins (not shown).

The accumulator 10 may be submerged in water at any time, including for shipping purposes. A typical accumulator has twenty-seven (27) openings 12 forming individual but connected cells over a 20¼ inch length. Openings 12 are created by forming a cross-slit 22a in the top surface 14 of the container. As a cutting 16 is inserted into the accumulator 10, the cross-slit 22b is forced open to accommodate the cutting 16 and thereafter to support the cutting in the growing media 20, which substantially fills the oasis 18. The container is ½ inch in depth. The accumulator 10 possesses a degree of rigidity sufficient so that it can be handled by automatic equipment to allow for robotic cutting and insertion into the media 20. In an automated system, the accumulators 10 must work in concert with an autoloader (not shown).

Heretofore, geranium cuttings 16 were shipped and stored dry because of substantial discoloration of the leaves and stems if water is applied to the plants through normal watering systems. It has been found that applying water to the base of the plant 16 only provides for a vascular hydration system providing improved quality during shipping and storage, thus, permitting the plants to obtain their maximum growth potential. Further, because the cuttings 16 are now shipped and handled always in the upright position, as shown in FIG. 3, the gravitation accumulation of natural auxins provides for root promotion. Since the oasis 18 is water holding, callous cuttings 16 can likewise be shipped directly to customers who require such calloused cuttings 16 and growth regulators can be added to the water to prepare the plants for shipping and growing as well as postharvest conditioning chemicals to provide a quality product upon delivery.

The utilization of this accumulator 10 allows for automation of heretofore labor-intensified agricultural operations and not only reduces these costs, but results in higher quality and more reproducible and consistent propagation results.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A container for shipping and/or storing live plant cuttings prior to rooting comprising:

a long narrow base portion having a bottom and sidewalls and end walls depending upward from the bottom to define an open enclosure;

a water holding propagating medium positioned in and substantially filling the enclosure;

a cover attached at a top of the base portion to close off the open enclosure to form an oasis for the plants; and said cover including a plurality of openings spaced along a longitudinal axis, said openings configured and dimensioned to form cells to retain live plants in an upright position when inserted through the opening into the propagating medium.

2. The container of claim 1 wherein the base portion and cover are formed of a plastic material having sufficient rigidity to withstand handling in a processing line.

3. The container of claim 2 wherein each opening consists of a central aperture and a plurality of slits extending radially outward from the aperture to permit the plant to pass therethrough and thereafter to grip the plant.

4. The container of claim 1 wherein the oasis contains water.

5. The container of claim 4 wherein the oasis includes nutrients.

6. The container of claim 4 wherein the oasis includes at least one storage and shipping chemical selected from the group consisting of cytokinins and auxins.

7. The container of claim 1 wherein the propagating medium is an ureaformaldehyde foam.

8. The container of claim 1 wherein the cover includes more than twelve openings.

9. The container of claim 1 wherein the openings are equally spaced along its longitudinal axis.

10. The container of claim 1 wherein the base portion includes a flange extending about a periphery of top surfaces of the sidewalls and end walls, said flange attaching to said cover.

11. The container of claim 10 wherein the cover extends beyond each end wall.

12. The container of claim 11 wherein an aperture extends through each portion of the cover which extends beyond the end wall.

13. A container for shipping and/or storing live plant cuttings prior to rooting comprising:

a long narrow trough having sidewalls, end walls and a flange extending outwardly about the periphery of the trough along the top thereof;

a cover attached to the flange to close off the trough and form an oasis therein, said cover including a plurality of openings equally spaced along a longitudinal axis, said openings consisting of a central aperture and at least one cross-slit extending along a diameter of the aperture, said aperture and cross-slit configured and dimensioned to accommodate the entry of a plant without damaging the plant; and a water holding propagating medium substantially filling the oasis so as to form individual but connected cells with each cell adapted to accommodate a plant and in combination with the cover to hold the plant in an upright position.

14. A method of preparing live plant cuttings for shipping and/or storage, prior to rooting, comprising:

a) filling a container formed of an elongated trough having a cover with a plurality of axially spaced openings and radial slits along a longitudinal axis with a water holding propagating medium, so that the medium substantially fills the trough, and optionally a growth regulator and optionally a postharvest conditioning chemical to form isolated yet connected cells in the trough;

b) sticking a cutting through each opening into the cell whereby a plant is retained in an upright position by the propagating medium and the opening in each cell; and c) filling the trough with water to form a vascular hydration system to promote root formation.

15. The container of claim 1, wherein the hydratable propagating medium is a single component.

* * * * *

UNITED STATES PATENT AND TRADEMARK OFFICE
CERTIFICATE OF CORRECTION

PATENT NO   : 6,138,410
DATED       : October 31, 2000
INVENTOR(S) : J. Robert Oglevee It is certified that error appears in the above-identified patent and that said Letters Patent is hereby corrected as shown below:

Title Page [54] TITLE "ACCUMULATION" should read --ACCUMULATOR--.

Column 1, Line 3, "ACCUMULATION" should read --ACCUMULATOR--.

Signed and Sealed this

Twenty-second Day of May, 2001

*Attest:*

NICHOLAS P. GODICI

*Attesting Officer*   *Acting Director of the United States Patent and Trademark Office*